(No Model.)
H. STURM.
DRAFT EQUALIZER.
No. 526,271. Patented Sept. 18, 1894.
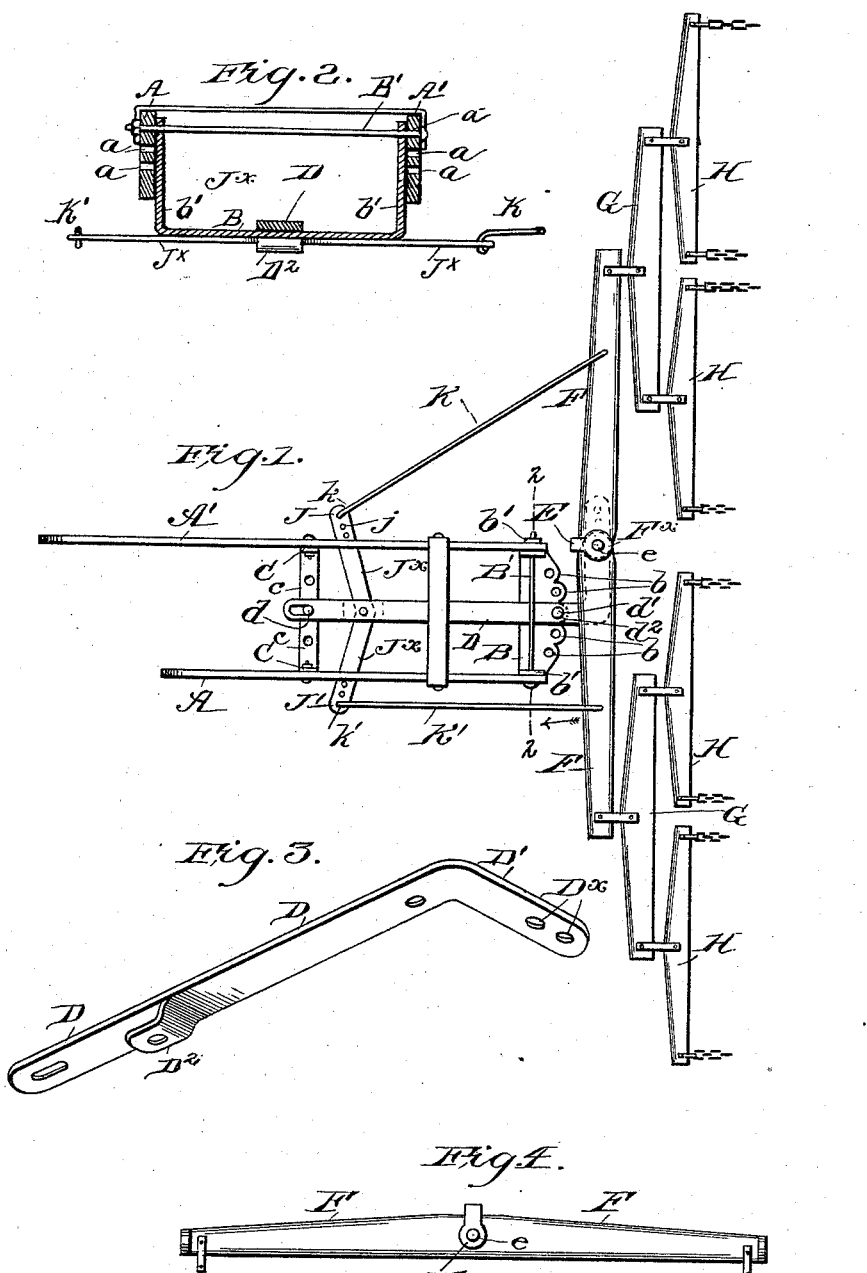
WITNESSES:
Fred G. Dieterich
H. J. Robinson
INVENTOR
Henry Sturm.
BY Munn & Co
ATTORNEYS.

UNITED STATES PATENT OFFICE.

HENRY STURM, OF NAUVOO, ILLINOIS.

DRAFT-EQUALIZER.

SPECIFICATION forming part of Letters Patent No. 526,271, dated September 18, 1894.

Application filed November 13, 1893. Serial No. 490,834. (No model.)

*To all whom it may concern:*

Be it known that I, HENRY STURM, residing at Nauvoo, in the county of Hancock and State of Illinois, have invented certain new and useful Improvements in Draft-Equalizers, of which the following is a specification.

My invention relates more particularly to improvements in four horse eveners, more especially adapted for use with either right or left tongue or tongueless gang plows, and it has for its object to provide devices of this character simple and inexpensive in construction, which can be easily connected with the object to be drawn, and which will effectively serve for their intended purpose.

It has also for its object to provide evener devices so arranged and constructed, that the plows can be drawn to work close up to the ends of the field, in which the front or draft point can be changed from right to left, whereby to take more or less land, and whereby more space will be allowed the horse in the furrow, to walk steady, without crowding on the others.

With other minor objects in view all of which will hereinafter be particularly referred to, my invention consists in the novel combination and arrangement of parts, which will be first described and then specifically pointed out in the claims, reference being had to the accompanying drawings, in which—

Figure 1 is a plan view of my improved draft equalizer attached to the gang plow beams. Fig. 2 is a transverse section taken on the line 2—2 Fig 1. Fig. 3 is a detail perspective view of the main equalizer or draft bar, and Fig. 4 is a view of a modified form of the main equalizer beam hereinafter referred to.

Referring to the accompanying drawings A A' indicate the plow beams, the ends of which are connected by a transverse clevis member B formed with a series of apertures $b\ b$; such beams being also connected by a ⊔ cross piece C the base member $c$ of which forms the rear or pivot bearing for the main draft bar D, the rear end of which is pivotally connected therewith by the bolt $d$, its front portion being adjustably connected to the clevis B, by the bolt $d'$ which passes through an aperture $d^2$ in such bar and any one of the apertures $b$. By providing a series of apertures in the plate B, the bar is capable of being adjusted to the right or left.

The clevis member B is preferably connected with the clevis ends of the plow beams, by a transverse rod B' passed through the apertured bent up ears $b'\ b'$ and any one of the apertures $a$ in the plow beams. By this construction, it will be noticed the front end of the draft bar can be adjusted vertically to change the draft pull as occasions may make it desirable.

The front end of the main draft bar D is bent at right angles as at D', which has a series of apertures $D^\times$ as most clearly shown in Fig. 3 of the drawings. Upon the end of the bar member D' is adjustably held by a bolt $e$, a clip member E in which is pivotally held the main or equalizing beam F, on the outer ends of which are pivotally held the double trees G, to which in turn are connected the single trees H. It will be noticed by reference to Fig. 1, that the bar D is held with its end D' projected inward, and such end D' is of such length that the pivot or connecting point of the beam F will always be approximately in front of the innermost plow beam A', whereby one of the horses will travel in line with the furrow. The bar D has at a point in advance of its rear pivot, a clip member $D^2$ in which is centrally pivoted a rear draft beam $J^\times$ formed of rearwardly inclined members J J', having a series of apertures $j$ in their outer ends, with any one of which are pivotally connected the rear ends $k\ k'$ of brace rods K K', which are connected at their front ends with the main beam F as clearly shown.

The beam F may be formed of a single member as shown in Fig. 4, but I prefer to form it of two sections centrally hinged as at $F^\times$ (see Fig. 1) whereby to shift the main draft back of the clevis ends of the beams. By thus dividing the front draft beam it will be noticed the pull on the double trees will be on the arms J J' of the rear draft bar, and as such bars project to each side of the said beams, it follows, that the draft will be equalized and at each side of the beams, and in consequence a direct and steady pull on the beams effected.

By connecting the central or horizontal draft bar D to the plow beams as stated, such bar is capable of lateral as well as vertical adjustment. By using a non-divided bar F, the draft pull will owing to the peculiar relation of the parts, also be direct, but instead of being almost entirely at a point behind the clevis member will also be partially on such member.

The several parts can be readily assembled, adjusted, and easily replaced in case of breakage.

Having thus described my invention, what I claim, and desire to secure by Letters Patent, is—

1. In a draft equalizer, the combination with the beam members, the rear transverse piece C and the front clevis member, of a draft bar pivotally connected at the rear end of the piece C, held for lateral adjustment on and to be detachably connected with the front clevis member, said draft bar having an angle portion at the front end, and a transversely projected member $J^\times$ centrally pivoted to the draft bar in advance of its rear pivot, the draft beam pivoted to the said angle portion, and the rods K pivoted at one end on the ends of the member $J^\times$ and connected at the other end to the draft beam all arranged substantially as shown and described.

2. In a draft equalizer, the combination with the beams A, A', the rear cross member C and the clevis member B, connected with the front end of the beams and vertically adjustable thereon, and having a series of apertures $b$, of a draft bar pivotally connected at its rear end to the member C, its front end resting on the front clevis and having a pin connection with its apertures $b$, a draft beam secured to the front end of such bar, a transverse bar $J^\times$ centrally pivoted to the rear portion of the draft bar in advance of its rear pivot and the rods K adjustably connected at their rear ends to the ends of the bar $J^\times$ and at their front ends to the draft beam all arranged substantially as shown and described.

HENRY STURM.

Witnesses:
EDWARD ARGAST, Sr.,
BENEDIKT GNANN.